US005853802A

United States Patent [19]
Boyer et al.

[11] Patent Number: 5,853,802
[45] Date of Patent: Dec. 29, 1998

[54] METHODS FOR SPRAY-ON INSULATION

[75] Inventors: Harold F. Boyer, Houston; Steven A. Kempe, Richmond; William F. Boyer, Pearland, all of Tex.

[73] Assignee: International Cellulose Corporation, Houston, Tex.

[21] Appl. No.: 962,161

[22] Filed: Oct. 31, 1997

Related U.S. Application Data

[63] Continuation-in-part of Ser. No. 509,544, Jul. 31, 1995, Pat. No. 5,684,068.

[51] Int. Cl.$^6$ ........................................................ B05D 5/10
[52] U.S. Cl. .......................... 427/207.1; 427/11; 427/214; 427/421; 427/180; 427/206; 427/426
[58] Field of Search .................................. 427/11, 207.1, 427/214, 421, 180, 206, 426

[56] References Cited

U.S. PATENT DOCUMENTS

| | | | |
|---|---|---|---|
| 1,718,507 | 6/1929 | Wenzel et al. . | |
| 1,978,125 | 10/1934 | Bennett | 91/68 |
| 2,251,296 | 8/1941 | Shipp | 91/68 |
| 2,419,880 | 4/1947 | Blyler et al. | 20/89 |
| 2,439,108 | 4/1948 | Staehle | 117/62 |
| 2,470,641 | 5/1949 | Portz | 252/62 |
| 2,553,781 | 5/1951 | Oliver . | |
| 3,003,979 | 10/1961 | Ptasienski et al. | 260/17 |
| 3,027,326 | 3/1962 | Moffett | 252/62 |
| 3,098,049 | 7/1963 | Borchert | 260/17.4 |
| 3,135,648 | 6/1964 | Hawkins | 161/249 |
| 3,425,972 | 2/1969 | Nobile et al. | 260/17.4 |
| 3,438,808 | 4/1969 | Hawkins et al. | 117/155 |
| 3,561,447 | 2/1971 | Alexander | 128/290 |
| 3,650,805 | 3/1972 | Imoto et al. | 117/62.2 |
| 3,654,928 | 4/1972 | Duchane | 128/290 |
| 3,853,971 | 12/1974 | Kato et al. | 260/901 |
| 3,888,962 | 6/1975 | Ostertog et al. | 264/122 |
| 3,996,145 | 12/1976 | Hepburn | 252/62 |
| 4,045,265 | 8/1977 | Tajima et al. | 156/71 |
| 4,115,187 | 9/1978 | Davidson | 162/168 R |
| 4,187,983 | 2/1980 | Boyer | 239/9 |
| 4,245,744 | 1/1981 | Daniels et al. | 206/812 |
| 4,254,177 | 3/1981 | Fulmer | 428/256 |
| 4,258,849 | 3/1981 | Miller | 206/812 |
| 4,284,674 | 8/1981 | Sheptak | 428/69 |
| 4,297,153 | 10/1981 | Erickson et al. | 156/63 |
| 4,316,745 | 2/1982 | Blount | 106/287.34 |
| 4,323,494 | 4/1982 | Blount | 524/858 |
| 4,324,864 | 4/1982 | Blount | 521/100 |
| 4,328,136 | 5/1982 | Blount | 523/204 |
| 4,343,133 | 8/1982 | Daniels et al. | 53/431 |
| 4,343,134 | 8/1982 | Davidovich et al. | 53/431 |
| 4,343,403 | 8/1982 | Daniels et al. | 206/812 |
| 4,360,440 | 11/1982 | Boyer et al. | 252/62 |
| 4,372,447 | 2/1983 | Miller | 206/812 |
| 4,374,687 | 2/1983 | Yamamoto | 156/71 |
| 4,386,183 | 5/1983 | Wempe | 524/405 |
| 4,409,352 | 10/1983 | Beckerle et al. | 524/405 |
| 4,419,256 | 12/1983 | Loomis | 252/62 |
| 4,440,830 | 4/1984 | Wempe | 428/352 |
| 4,537,807 | 8/1985 | Chan et al. | 428/74 |
| 4,537,820 | 8/1985 | Nowabilski et al. | 412/285 |
| 4,837,067 | 6/1989 | Carey Jr. et al. | 428/108 |
| 4,849,289 | 7/1989 | Bernard et al. | 428/404 |
| 4,877,686 | 10/1989 | Riou et al. | 428/514 |
| 5,077,128 | 12/1991 | Bernard et al. | 428/392 |
| 5,163,859 | 11/1992 | Beltrani et al. | 441/64 |
| 5,190,997 | 3/1993 | Lindemann et al. | 524/44 |
| 5,234,968 | 8/1993 | Debus et al. | 524/42 |
| 5,251,398 | 10/1993 | Balassa | 47/2 |
| 5,316,837 | 5/1994 | Cohen | 428/285 |
| 5,332,432 | 7/1994 | Okubi et al. | 106/287.13 |
| 5,338,349 | 8/1994 | Farrar | 106/18.12 |
| 5,403,128 | 4/1995 | Thomas | 406/39 |
| 5,439,010 | 8/1995 | Ross | 131/332 |

FOREIGN PATENT DOCUMENTS

| | | |
|---|---|---|
| 2079033 | 11/1971 | France . |
| 2469439 | 5/1981 | France . |
| 2906345 A1 | 8/1979 | Germany . |

OTHER PUBLICATIONS

"CAFCO Heat Shield," Isolatek Int'l Corp., 1988.
"Ure–K Spray Coating," Int'l Cellulose Corp. (Owner of present application, 1988.
"K–13 fc," Int'l Cellulose Corp., 1987.
"Celbar Spray–On Systems," Int'l Cellulose Corp., 1988.
"Poly (Vinyl Alcohol) for Adhesives," Chap. 22, Handbook of Adhesives, Ed. by Skeist, 1994.
PCT/GB 96/01825 Int'l Search Report.
"Airvol Polyvinyl Alcohol," Air Products, 1990.
"K–13 Spray–On–Systems Application Manual," International Cellulose Corporation, Jan. 1988.

Primary Examiner—James J. Seidleck
Assistant Examiner—U. K. Rajguru
Attorney, Agent, or Firm—Guy McClung

[57] ABSTRACT

The present invention, in certain embodiments, discloses a method for treating cellulose fibers comprising treating cellulose fibers with an acidic medium, and applying an adhesive composition to the cellulose fibers, the adhesive composition including polyvinyl alcohol cooked without addition of an acidic substance. The present invention, in certain embodiments, discloses a method for spraying with a spray nozzle an insulation composition onto a substrate, the method including introducing cellulose fibers under pressure through a first hose into the spray nozzle, the cellulose fibers treated with an acidic medium, introducing an adhesive composition under pressure through a second hose into the spray nozzle, the adhesive composition comprising polyvinyl alcohol cooked without an acidic medium, and spraying from the spray nozzle the treated cellulose fibers and adhesive composition onto the substrate.

32 Claims, No Drawings

METHODS FOR SPRAY-ON INSULATION

RELATED APPLICATION

This is a continuation-in-part of U.S. application Ser. No. 08/509,544 filed on Jul. 31, 1995 entitled "Spray On Insulation" issued as U.S. Pat. No. 5,684,068 on Nov. 4, 1997.

BACKGROUND OF THE INVENTION

1. Field of the Invention

This invention is directed to fibrous cellulose spray-on insulation, adhesives used therewith, and to methods for their use.

2. Description of Related Art

The prior art discloses a wide variety of spray-on cellulose insulation materials and systems. Certain prior art compositions used in spray-on insulation systems include an adhesive which is a mixture of sodium silicate and an acrylic resin. A homogeneous mixture of these two ingredients is achieved by combining them with a high speed shearing-mixing action. After a period of time the ingredients of the mixture can settle out and separate from each other. Under prolonged storage conditions such a mixture will gel and then require laborious re-mixing, e.g. with a high speed mixer. Other disadvantages of such adhesives include: limited flexibility; limited freeze/thaw (temperature differential) stability; and limited water resistance; and the requirement for additional handling, mixing, etc. at a job site. Such prior art compositions are also typically used in a ratio of water to adhesive 3:5; and at a ratio of such a mixture (water+adhesive) to fiber of 0.23 gallons of mixture to about one pound of fiber. It would be desirable in certain embodiments to be able to use less adhesive concentrate to reduce transport cost and material expense.

Polyvinyl alcohol ("PVOH") is a known adhesive which, for many applications is dissolved in water prior to use and "cooked". Typically this cooking involves dispersing particles of PVOH in water at ambient temperature and raising the resulting mixture's temperature to between 180 and 205 degrees Fahrenheit (85 to 96 degrees C.) for about 30 minutes. It is known in certain PVOH cooking processes to add an acidic medium (e.g. boric acid) to PVOH during the cooking process to improve the resulting material's wet strength, water resistance and fire retardancy. To prevent gelling, the pH of a homogeneous amount of PVOH and boric acid is adjusted, from the range of 6.7–7.3 to between about 4.5 to 4.7, e.g. by adding an acid (such as citric acid or phosphoric acid). The pH is monitored and maintained between 4.5 to 4.7 as boric acid is added. Addition of acid to the PVOH can result in a more corrosive material which must be safely contained, packaged, transported and used. Also, the amount of acid that can be added is limited by the saturation level of water at ambient temperature.

SUMMARY OF THE PRESENT INVENTION

The present invention discloses a spray-on insulation material with improved water resistance, fire retardancy, and wet strength.

The present invention, in certain embodiments, discloses a two component spray-on insulation. One component is polyvinyl alcohol ("PVOH") cooked without the addition of an acidic substance (medium); or such PVOH with an additive such as an acrylic polymer. Another component is a combination composition which includes cellulose fibers (e.g. as described in U.S. Pat. Nos. 4,360,440; 5,082,563; 5,195,465; and 5,352,780) and a cross-linking substance, e.g., but not limited to, an acidic substance (medium) (solids and/or liquid); e.g. (but not limited to) granular alkali metal borate or alkaline borate, including but not limited to, granular boric acid solids or soluble salts thereof (e.g. about the size of table salt granules) for supplying a borate ion such as those commercially available from U.S. Borax Co. These solids are powderized to reduce them in size (e.g. to about the size of particles of commercially available baby powder). Milling typically occurs at a temperature of about 165° F. with an air flow through the mill. Air flow is used to convey fibers in various processing steps resulting in a moisture content in the fibers of about 10 to 15 percent by weight. In other embodiments liquid borax is used.

In certain embodiments the cellulose fibers and acidic solids are mixed together; in other embodiments they are ground together in a processing mill (e.g. a hammer mill available from Williams Co., Grundler Co., Jacobs Co., or Bliss Co.). In one embodiment about 75 to 85 pounds of fibers (2.5 mm in an average largest dimension) are mixed or milled with about 15 to 25 pounds of powdered boric acid solids. In another embodiment the treated fibers have ingredients ranging, by weight, as follows (the total percentage of finished product having components within the stated ranges equalling one hundred percent):

between 75% to 85% cellulose fibers between 10% to 25% solid acidic medium, e.g. boric acid between 0% to 12% (in certain embodiments 8% to 12%) sprayed-on aqueous acidic medium, e.g. aqueous boric acid solution (Examples: 75% cellulose fibers and 25% solid boric acid; 75% cellulose fibers, 17% solid boric acid, 8% aqueous boric acid; 81% cellulose fibers, 10% solid boric acid, 9% aqueous boric acid)

In one aspect fibers mixed together with the acidic medium and/or milled with the acidic medium are also sprayed with an aqueous liquid acid solution to further coat and/or impregnate them with the acidic medium. In one embodiment the fibers are sprayed with the acidic medium with a one-nozzle device or with a two-nozzle device as shown, e.g., in FIG. 7 of U.S. Pat. No. 5,429,741 (incorporated in its entirety herein by reference).

In another embodiment cellulose fibers are fed through a first hose to an insulation composition spray nozzle and the acidic medium is fed through a separate second hose to the nozzle so that the acidic medium is applied to the cellulose fibers within and as they leave the nozzle. Adhesive composition is introduced through another hose to the nozzle.

In certain aspects of any method disclosed herein for spraying an insulation composition onto a substrate, the composition is sprayed on to a depth of at least 4, 5, 6, 7, or 8 inches.

In one spray-on insulation system according to the present invention the cellulose-fiber-acidic-solids mixture as described above is introduced through one hose to an insulation spray nozzle (e.g. as shown in U.S. Pat. No. 4,187,983) and a liquid PVOH adhesive (including commercially available PVOH adhesives and, in one aspect glyoxalated polyvinyl alcohol adhesive, e.g. but not limited to, as disclosed in U.S. Pat. No. 4,537,807) is introduced into the spray nozzle through another hose. In other embodiments the liquid PVOH adhesive is mixed with a liquid acrylic polymer, or, acrylic resin or emulsion, such as (but not limited to) FT-9™ PVC material, B. F. Goodrich Co.; 1415™ vinyl acrylic material, Rhone-Poulenc Co.; 6326™ vinyl acrylic material, Rohm & Haas Co.; 1845™ vinyl acrylic material, B. F. Goodrich Co.; 1199™ Styrene acrylic latex, Rhone-Poulenc Co.; 526 BP™ vinyl acetate, Air Products Co.; and Res. 7800™ polyvinyl acetate copolymer, Unocal Co.; and the mixture is fed to the spray nozzle. The added acrylic polymer increases the resulting product's toughness, water resistance fire retardancy, elasticity and bonding ability.

In other embodiments of another aspect of the present invention, treated fiber (as described above and below, treated with ground-in acidic solids and/or with sprayed on liquid acid) is used in a spray-on insulation with prior art PVOH that is cooked with an acidic medium, and with such PVOH that is cooked with the addition of additional acid as described above. Such adhesives are usable in embodiments similar to those described herein in place of the adhesives according to this invention and in the same proportions.

In certain embodiments of the present invention fibers and methods of their use are provided which make available more boric acid for the final product than prior art materials and methods in which boric acid is added to cooking PVOH.

The acid described herein may be, in certain aspects, any suitable pH mineral or organic acid medium including, but not limited to, sodium pentaborates, ulexite, (in certain aspects at pH of 2.0 to 6.0 and more commonly pH 3.0 to 5.5 depending upon the concentration of acid used). Such mediums include, but are not limited to boric acid, dilute phosphoric acid, fumaric, oxalic, malic, dilute KCl, etc.

The acid medium, in certain aspect, may also contain other conventional ingredients such as surface active detergent, humectants, bactericides, emulsifiers and scenting or perfuming agents can also be used without detrimental effect. The cross-linking agent for use in certain aspects of this invention may be, but is not limited to, any suitable acid, glyoxal, urea formaldehyde, melamine formaldehyde, trimethyl melamine, ammonium sulfate, ammonium chloride or any cross-linking agent disclosed in U.S. Pat. No. 5,439,010.

The present invention discloses, in certain aspects, a method for treating cellulose fibers including treating cellulose fibers with an acidic medium, and applying an adhesive composition to the cellulose fibers, the adhesive composition including polyvinyl alcohol cooked without addition of an acidic medium; such a method wherein the adhesive includes acrylic polymer or acrylic resin; any such method wherein the adhesive includes a cross-linking agent; any such method wherein the acidic medium is solid acidic medium and the cellulose fibers are treated with the acidic medium by grinding the acidic medium into the cellulose fibers; any such method wherein the acidic medium is aqueous acidic medium and cellulose fibers are treated with the acidic substance by spraying the aqueous acidic medium onto the cellulose fibers; any such method wherein acidic medium is both ground into the cellulose fibers and sprayed thereon; any such method wherein the solid acidic medium is powderized boric acid and the aqueous acidic medium is a boric acid solution; any such method wherein the acidic medium is boric acid; any such method wherein the acidic medium is between 15% to 30% by weight of the treated cellulose fibers; any such method wherein the adhesive is applied by coating the cellulose fibers; any such method wherein the adhesive is applied by immersing the cellulose fibers in the adhesive; any such method wherein, prior to applying the adhesive composition to the cellulose fibers, the adhesive composition is prepared by heating water in a vessel to a first temperature, adding acidic medium to the water, agitating contents of the vessel, and raising contents of the vessel to a second temperature above the first temperature; any such method wherein the first temperature is at least 120° F. or at least 150° F. or the first temperature is between about 150° F. and 380° F.; any such method wherein the first temperature is between about 150° F. and 280° F.; any such method wherein the second temperature is at least about 110° F.; any such method wherein the acidic medium is powderized boric acid; any such method wherein adding acidic medium to the water includes adding powderized boric acid to the water, and then adding borax to the water; any such method wherein the water with powderized boric acid and borax is raised to the second temperature; any such method wherein the second temperature is at least 180° F.; any such method wherein the second temperature is maintained for at least about 30 minutes; any such method further including treating the cellulose fibers with aluminum sulfate; any such method wherein treating the cellulose fibers with pigment; any such method wherein the cellulose fibers after treating are a treated product which is, by weight, between 75% to 85% cellulose fibers, and between 10% to 25% acidic substance; any such method wherein the cellulose fibers after treating with acidic medium are a treated product which is, by weight between 75% to 85% cellulose fibers, between 10% to 25% solid acidic medium, and between 0% to 12% aqueous acidic medium; any such method wherein the solid acidic medium is powderized boric acid and the aqueous acidic medium is aqueous boric acid.

The present invention discloses, in certain aspects, a method for spraying with a spray nozzle an insulation composition onto a substrate, the method including introducing cellulose fibers under pressure through a first hose into the spray nozzle, the cellulose fibers treated with an acidic medium, introducing an adhesive composition under pressure through a second hose into the spray nozzle, the adhesive composition comprising polyvinyl alcohol cooked without an acidic medium, and spraying from the spray nozzle the treated cellulose fibers and adhesive composition onto the substrate; any such method wherein the cellulose fibers are treated with an acidic medium including solid boric acid; any such method wherein the solid boric acid is powderized boric acid ground-in to the cellulose fibers; any such method wherein the cellulose fibers are treated with an acidic medium including aqueous boric acid solution; any such method wherein the aqueous boric acid solution is sprayed onto the cellulose fibers; any such method wherein the cellulose fibers are treated with an acidic medium including solid boric acid, wherein the solid boric acid is powderized boric acid ground-in to the cellulose fibers, and wherein the cellulose fibers are treated with an acidic medium including aqueous boric acid, and wherein the aqueous boric acid is sprayed onto the cellulose fibers; any such method further including the treated cellulose fibers being between about 75% to 85% by weight cellulose fibers, and between about 13% to 25% by weight of solid boric acid ground together with the cellulose fibers, about 8% to 12% by weight of aqueous boric acid sprayed-on the treated cellulose fibers, and specific percentages of cellulose fibers, solid boric acid, and aqueous boric acid chosen within the stated percentage ranges so that the total percentage equals one hundred percent; any such method further including spraying the insulation composition onto the substrate to a depth of at least 4 inches or spraying the insulation composition onto the substrate to a depth of at least 8 inches.

It is, therefore, an object of at least certain preferred embodiments of the present invention to provide:

New, useful, unique, efficient, nonobvious safe fibrous materials for use in spray-on insulations;

Such materials which are self-extinguishing;

Such insulations which use PVOH which is not "cooked" with an acidic medium;

Such insulations which exhibit increased toughness, water resistance, fire retardancy, bonding and wet strength;

Such insulations which can be effectively applied up to four inches in depth, and in certain aspects up to eight inches in depth; and Methods for using such materials.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure. The detail in these descriptions is not intended to thwart this patent's object to claim this invention no matter how others may later disguise it by variations in form or additions of further improvements.

A more particular description of embodiments of the invention briefly summarized above may be had by references to certain embodiments which are described. These embodiments are not to be used to improperly limit the scope of the invention which may have other equally effective or legally equivalent embodiments.

DESCRIPTION OF EMBODIMENTS PREFERRED AT THE TIME OF FILING FOR THIS PATENT

An acidic medium component for treating cellulose fibers, in one embodiment, is made by introducing boric acid in powder form into a hammer mill with cellulose fibers. In one aspect a ratio of 17 to 22 pounds of boric acid powder is introduced into the hammer mill where it is combined with 83 to 78 pounds of fibers and milled together. In one aspect the fiber/boric acid ratio, by weight, is 41:9. The fibers in this embodiment have an average largest dimension of 2.5 mm. In one embodiment the fibers with acid in and on them are then fed to a treatment vessel wherein they are sprayed with a solution of boric acid/borax and water (e.g. an aqueous solution which is 15 to 25% by weight liquid borax/boric acid). In one embodiment about 75 pounds of fibers are treated with about 25 pounds of chemical treatment which includes 90% to 95% powdered boric acid solids by weight and 5% to 10% liquid boric acid by weight, producing about 100 pounds of treated fibers. In another aspect fibers from the hammer mill (with or without ground-in acidic solids) are immersed in a container of boric acid solution to treat them. In one aspect the total boric acid in the treated product fibers can be between 50% to 100% powdered solids and between 0% to 50% liquid boric acid (in aqueous solution); in such embodiments the acidic medium (in all forms) is between 15% to 30% by weight of the treated fibers product. In one aspect the fibers are then fed to one hose of a multi-component spray nozzle. A mixture of PVOH (in one embodiment of the invention the PVOH used is PVOH #107 commercially available from Air Products Co.) and acrylic resin (see e.g. U.S. Pat. No. 4,360,440 fully incorporated herein by reference) is fed to another hose of the spray nozzle. The PVOH/acrylic resin mixture is prepared by pouring the components into a container and then mechanically mixing them, e.g. with a direct drive exterior dual helix shaft rotated at 1750 r.p.m. for five to ten minutes. In one aspect 0.23 gallons of PVOH/acrylic resin mixture is used for each pound of fibers. Pumps such as commercially available diaphragm pumps pump the adhesive mixture to the spray nozzle and the treated fibers to the spray nozzle and a spray-on insulation composition is produced.

A spray-on composition according to this invention can be effectively sprayed onto a variety of substrates such as wood, concrete, plastic, metal, ceramic, sheetrock, and paintable surfaces to any desired depth up to about four, five, six, seven or eight inches (in certain aspects to a desired depth up to four inches) without the undesirable falling out of flakes or chunks of material and without the need for any wire mesh, wire, or other mechanical support for the material as it is applied and/or as it dries.

In one embodiment an aqueous acidic medium solution for spraying onto fibers treated in a hammer mill as described above is prepared by mixing about 700 gallons of water, about 2018 pounds of powderized boric acid, and about 2845 pounds of Borax material, e.g. Borax commercially available from U.S. Borax Co. The water is added to a glass lined vessel, and is heated by a boiler. When the temperature reaches at least about 120° F. and preferably 150 degrees F., powderized boric acid is introduced into the vessel. (In certain aspects this temperature is between about 150° F. and 380° F. or between 150° F. and 280° F.) It takes approximately 30–45 minutes to add the boric acid and temperature in the vessel is, preferably, raised continuously during such addition. Then the borax is introduced into the vessel by conveyor belt while the vessel's contents is agitated. It takes approximately one hour to add the borax. The temperature of the total solution is raised to 180 degrees F. while agitating the solution. If the temperature in the vessel is permitted to fall below 110 degrees F. components of the solution will start to separate out, crystallize, and settle out. In certain aspects the vessel's contents are heated for 30 minutes at about 180° to 190°; for 25 minutes at about 220°; or for 20 minutes at about 240°. The resulting solution has a density of 10.20 pounds/gallon; there is about 4.64 pounds of chemical (boric acid powder plus borax) in a gallon of resulting solution; and pH of the solution is 7.33 at 110 degrees F.

In one embodiment the commercially available granular boric acid has a particle size of 100 mesh (0.01") (average largest dimension). The granular boric acid is conveyed by a screw-conveyor to a hopper from which it is fed to a pulverizer which is driven by 15 h.p. motor at R.P.M. 3600 and has sieve size of 0.035". Finished powdery boric acid with an average largest dimension of 0.035" drops into a collection hopper.

In one embodiment a known weighed amount of powder boric acid is put in a large blender and a known amount of aluminum sulfate and pigment are added. The ratio (by weight) or various ingredients is as follows:

| Boric Acid | 65.30%–100% | |
|---|---|---|
| Aluminum Sulfate | 0 to 24.25% | (optional) |
| Pigment | 0 to 10.45% | (optional) |

Alternatively, instead of or in addition to aluminum sulfate, known catalysts may be used and/or aluminum trihydrate. The chemicals and pigment are mixed by a ribbon blender to a homogenous mixture. Then the mixture is dropped into a small mixing blender;, then fed into a finishing mill by a d.c. drive chemical screw delivering an exact amount of finished dry-chemical-to-fiber in the mill which are mixed thoroughly with cellulose fibers while grinding. Treated fibers (i.e. with ground-in powderized boric acid solids, aluminum sulfate and pigment) are then drawn through a screen in the mill due to vacuum created by a downstream finishing fan. The treated fibers are then passed through a pipe. Fire retardant liquid chemical (aqueous boric acid solution prepared as described above) is fed to two nozzles in the pipe by a chemical metering pump and sprayed onto the treated fibers flowing through the pipe. The resulting mixture then goes through a fan to a cyclone which separates out undesirable fines from the fibers. The fibers are then fed to a bagger hopper and packaged into a plastic bag.

Table I presents data illustrating wet strength of a spray-on insulation product according to the present invention. Products A and C were not treated with powdered acidic solids. Product A was prepared by forming a one-inch thick piece of material with cellulose fiber (without boric acid treatment) sprayed with an adhesive, e.g. Air Products PVOH #107. About 0.23 gallons adhesive mixture were sprayed with each pound of fiber. "Reduce 5:1" means 5 parts of water were used for each part of adhesive mixture. (Alternatively this ratio may range between 2:1 to 10:1, with more wet strength resulting as the 2:1 ratio is approached and less wet strength as the 10:1 ratio is approached.) "Set Time" is the time the sample was allowed to set prior to testing. "Tare Wt." means the weight of test apparatus connected to the test sample. "Add Wt." is the amount of additional weight hung from the sample during testing. "Total Wt." is the weight a sample supported at failure (tearing of the material). "Time To Failure" is the time taken for the sample to fail once the "Total Wt." was applied. As noted, samples A and C failed fairly quickly with relatively small weights applied to them.

Sample B was produced as described above according to the present invention by treating cellulose fiber (average largest dimension 2.5 mm; moisture content 10% to 15% by weight) with powdered boric acid solids ground-in and aqueous boric acid solution sprayed-on. Such samples supported significantly more weight (indicative of increased ability to "hang" or spray material on a substrate to a significantly increased depth).

Sample C is material as described in U.S. Pat. No. 4,360,440.

Sample D is material as described in U.S. Pat. No. 4,360,440; but which has been treated with boric acid as was Sample B.

Each Sample A–D was a sample piece 6"×8"×1".

TABLE I

| Product | Reduce | Set Time | Tare Wt. (grams) | Add Wt. (grams) | Total Wt. (grams) | Time To Failure |
|---|---|---|---|---|---|---|
| A | 5:1 | 5 Min. | 80 | 60 | 140 | 35 Sec. |
|   | 5:1 | 10 Min. | 80 | 57 | 137 | 43 Sec. |
|   | 5:1 | 30 Min. | 80 | 81 | 161 | 100 Sec. |

| Product | Reduce | Set Time | Tare Wt. | Add Wt. | Total Wt. (grams) | Time To Failure |
|---|---|---|---|---|---|---|
| B | 5:1 | 5 Min. | 80 | 220 | 300 | 230 Sec. |
|   | 5:1 | 10 Min. | 80 | 611 | 691 | 270 Sec. |
|   | 5:1 | 30 Min. | 80 | 580 | 660 | 200 Sec. |

| Product | Reduce | Set Time | Tare Wt. | Add Wt. | Total Wt. | Time To Failure |
|---|---|---|---|---|---|---|
| C | 4:1 | 5 Min. | 82 | 0 | <82 | 0 Sec. |
|   | 4:1 | 10 Min. | 82 | 0 | <82 | 0 Sec. |

| Product | Reduce | Set Time | Tare Wt. | Add Wt. | Total Wt. | Time To Failure |
|---|---|---|---|---|---|---|
| D | 4:1 | 5 Min. | 119 | 77 | 196 | 22 Sec. |
|   | 4:1 | 10 Min. | 119 | 62 | 181 | 30 Sec. |

Table II presents data for bond strength for a variety of adhesive mixtures according to the present invention. "SOURCE" indicates the company from which the ingredient is commercially available: "AP" is Air Products Co.; "RH" is Rohm & Haas Co.; "BFG" is B. F. Goodrich Co.; "DS" is Diamond Shamrock Co.; "TYPE" indicates the product's identifying number. "7200.5" is AP 7200 diluted half-and-half with water. "PVOH" is polyvinyl alcohol (e.g. #107 available from Air Products Co. which is not cooked with additional acid added and is not cooked with boric acid). "%A" and "%B" mean the percent by volume of each component in the resulting mixture. "MIX" indicates water-to-adhesive mixture ratio by volume. "Film Shrink None" means there was no visible loss of contact from edges of a tray holding the sample. "Film Shrink Little" means there was visible loss of such contact. "Film Shrink Some" means such visible loss of contact was readily evident. "Film Elast Excel." means there was elongation equal to about 25% or more of original length when the sample was pulled at both ends simultaneously. "Film Elast Good" means such elongation of at least 25%. "Film Strength Excel." means able to support 100 times its own weight. "Film Strength Good" means able to support 50 times its own weight. "Bond P.S.F." is bond strength in pounds per square foot of a piece of the resulting material 13"×13". "Substr." indicates a substrate to which the adhesive mixture was applied and from which the 13"×13" piece (one inch thick) was removed. "Gal" is galvalume steel. "P.M." is painted metal (steel). "Wet Strength" means strength of a fibrous mass prior to drying. Tested films were 1"×12". Materials indicated in the last two entries were prepared with the adhesives described in U.S. Pat. No. 4,360,440 without boric acid.

TABLE II

| Source | | Type | | % | % | Mix | Film | | | | Bond | |
|---|---|---|---|---|---|---|---|---|---|---|---|---|
| "A" | "B" | "A" | "B" | "A" | "B" | H2O | Color | Shrink | Elast | Strength | P.S.F. | Substr. |
| AP | AP | AP-7200 | PVOH | 50 | 50 | 4:1 | White | None | Excel. | Excel. | 215 | P.M. |
| AP | AP | AP-7200 | PVOH | 50 | 50 | 5:1 | White | None | Excel. | Excel. | 250 | P.M. |
| AP | AP | AP-7200 | PVOH | 50 | 50 | 6:1 | | | | | 162 | P.M. |
| AP | AP | AP-7200 | PVOH | 50 | 50 | 7:1 | | | | | 175 | P.M. |
| AP | AP | AP-7200.5 | PVOH | 50 | 50 | 4:1 | White | Little | Good | Good | 80 | GAL |
| RH | AP | RH-1845 | PVOH | 50 | 50 | 4:1 | Off White | Little | Good | Good | 95 | GAL |
| RH | AP | RH-1845 | PVOH | 50 | 50 | 8:1 | | | | | 95 | GAL |
| BFG | AP | BFG-FT9 | PVOH | 50 | 50 | 4:1 | White | Some | Excel | Good | 76 | P.M. |
| BFG | AP | BFG-911 | PVOH | 50 | 50 | 4:1 | Off White | Some | Good | Good | 115 | GAL |
| | AP | | PVOH | | 100 | 5:1 | | | | | | |
| | AP | | PVOH | | 100 | 5:1 | | | | | | |
| | AP | | PVOH | | 100 | 5:1 | | | | | | |
| RH | DS | RH-6326 | Silicate | 60 | 40 | 4:1 | | | | | | |
| RH | DS* | RH-6326 | Silicate | 60 | 40 | 4:1 | | | | | 208 | |
| | AP | | PVOH | | 100 | 4:1 | | | | | | |

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A method for treating cellulose fibers comprising
treating cellulose fibers with an boric acid, and
applying an adhesive composition to the cellulose fibers, the adhesive composition comprising
polyvinyl alcohol cooked without addition of boric acid.

2. The method of claim 1 wherein the boric acid is solid and the cellulose fibers are treated with the boric acid by grinding the boric acid into the cellulose fibers.

3. The method of claim 1 wherein the boric acid is aqueous and cellulose fibers are treated with the boric acid spraying the aqueous boric acid onto the cellulose fibers.

4. The method of claim 1 wherein boric acid is both ground into the cellulose fibers and sprayed thereon.

5. The method of claim 4 wherein the solid boric acid is powderized boric acid and the aqueous boric acid is a boric acid solution.

6. The method of claim 1 wherein the boric acid is between 15% to 30% by weight of the treated cellulose fibers.

7. The method of claim 1 wherein the adhesive is applied by coating the cellulose fibers.

8. The method of claim 1 wherein the adhesive is applied by immersing the cellulose fibers in the adhesive.

9. The method of claim 1 wherein, prior to applying the adhesive composition to the cellulose fibers, the adhesive composition is prepared by
heating water in a vessel to a first temperature,
adding boric acid to the water,
agitating contents of the vessel,
raising contents of the vessel to a second temperature above the first temperature.

10. The method of claim 8 wherein
the first temperature is at least 120° F.

11. The method of claim 9 wherein
the first temperature is between about 150° F. and 380° F.

12. The method of claim 9 wherein
the first temperature is between about 150° F. and 280° F.

13. The method of claim 9 wherein the second temperature is at least about 110° F.

14. The method of claim 7 wherein the boric acid is powderized boric acid.

15. The method of claim 8 wherein adding boric acid to the water comprises
adding powderized boric acid to the water, and then the method further comprising
adding borax to the water.

16. The method of claim 15 wherein the water with powderized boric acid and borax is raised to the second temperature.

17. The method of claim 16 wherein the second temperature is at least 180° F.

18. The method of claim 16 wherein the second temperature is maintained for at least about 30 minutes.

19. The method of claim 1 further comprising
treating the cellulose fibers with aluminum sulfate.

20. The method of claim 1 further comprising
treating the cellulose fibers with pigment.

21. The method of claim 1 wherein
the cellulose fibers after treating are a treated product which is, by weight,
between 75% to 85% cellulose fibers, and
between 10% to 25% boric acid.

22. The method of claim 4 wherein
the cellulose fibers after treating with boric acid are a treated product which is, by weight
between 75% to 85% cellulose fibers,
between 10% to 25% solid boric acid,
between 0% to 12% aqueous boric acid.

23. The method of claim 22 wherein the solid boric acid is powderized boric acid.

24. A method for spraying with a spray nozzle an insulation composition onto a substrate, the method comprising introducing cellulose fibers under pressure through a first hose into the spray nozzle, the cellulose fibers treated with an boric acid, introducing an adhesive composition under pressure through a second hose into the spray nozzle, the adhesive composition comprising polyvinyl alcohol cooked without boric acid, and spraying from the spray nozzle the treated cellulose fibers and adhesive composition onto the substrate.

25. The method of claim 24 wherein the cellulose fibers are treated with boric acid including solid boric acid.

26. The method of claim 24 wherein the solid boric acid is powderized boric acid ground-in to the cellulose fibers.

27. The method of claim 24 wherein the cellulose fibers are treated with boric acid including aqueous boric acid solution.

28. The method of claim 27 wherein the aqueous boric acid solution is sprayed onto the cellulose fibers.

29. The method of claim 24 wherein the cellulose fibers are treated with solid boric acid, wherein the solid boric acid is powderized boric acid ground-in to the cellulose fibers, and wherein the cellulose fibers are treated with aqueous boric acid, and wherein the aqueous boric acid is sprayed onto the cellulose fibers.

30. The method of claim 29 further comprising the treated cellulose fibers further comprising between about 75% to 85% by weight cellulose fibers, and between about 13% to 25% by weight of solid boric acid ground together with the cellulose fibers, about 8% to 12% by weight of aqueous boric acid sprayed-on the treated cellulose fibers, and specific percentages of cellulose fibers, solid boric acid, and aqueous boric acid chosen within the stated percentage ranges so that the total percentage equals one hundred percent.

31. The method of claim 24 further comprising spraying the insulation composition onto the substrate to a depth of at least 4 inches.

32. The method of claim 24 further comprising spraying the insulation composition onto the substrate to a depth of at least 8 inches.

* * * * *